United States Patent
Wang et al.

(10) Patent No.: US 9,941,697 B1
(45) Date of Patent: Apr. 10, 2018

(54) SYSTEM USING A SUBCIRCUIT SHARED BETWEEN CAPACITORS FOR PROVIDING REACTIVE POWER

(71) Applicants: Yang Wang, Edmonton (CA); Wilsun Xu, Edmonton (CA)

(72) Inventors: Yang Wang, Edmonton (CA); Wilsun Xu, Edmonton (CA)

(73) Assignee: Wilsun Xu, Edmonton, Alberta (CA)

( * ) Notice: Subject to any disclaimer, the term of this patent is extended or adjusted under 35 U.S.C. 154(b) by 0 days.

(21) Appl. No.: 15/663,004

(22) Filed: Jul. 28, 2017

(51) Int. Cl.
*H02J 3/01* (2006.01)
*H02J 3/18* (2006.01)

(52) U.S. Cl.
CPC . *H02J 3/01* (2013.01); *H02J 3/18* (2013.01)

(58) Field of Classification Search
CPC ...................................... H02J 3/01; H02J 3/18
See application file for complete search history.

(56) References Cited

U.S. PATENT DOCUMENTS

| | | | |
|---|---|---|---|
| 3,038,134 A | 6/1962 | Forssell | |
| 3,535,542 A | 10/1970 | Gilsig | |
| 3,555,291 A | 1/1971 | Dewey | |
| 3,881,137 A | 4/1975 | Thanawala | |
| 3,955,134 A * | 5/1976 | Woodford | H02J 3/1828 323/206 |
| 4,406,991 A | 9/1983 | Strycula et al. | |
| 4,622,474 A | 11/1986 | Christl et al. | |
| 4,864,484 A | 9/1989 | Krueger et al. | |
| 4,939,486 A | 7/1990 | Bergdahl et al. | |
| 5,565,713 A | 10/1996 | Roseen | |
| 5,668,418 A | 9/1997 | Carlsson et al. | |
| 5,805,032 A | 9/1998 | Herbst et al. | |

OTHER PUBLICATIONS

IEEE Guide for Application and Specification of Harmonic Filters, IEEE Std 1531-2003.
Xu, W., et al "Resonance-Free Shunt Capacitors—Configurations, Design Methods and Comparative Analysis," in IEEE Transactions on Power Delivery, vol. 31, No. 5, pp. 2287-2295, Oct. 2016.

* cited by examiner

*Primary Examiner* — Robert Deberadinis
(74) *Attorney, Agent, or Firm* — Brion Raffoul

(57) ABSTRACT

Systems and devices that provide a shared detuning, damping, or filtering element to one or more capacitors. A number of circuit branches are coupled in parallel to each other between a first coupling point and a second coupling point. A subcircuit is coupled between the second coupling point and a third coupling point. Each branch includes at least one capacitor that provides reactive power to power systems while the subcircuit is configured to provide detuning, damping, or filtering to the multiple branches.

11 Claims, 8 Drawing Sheets ated capacitive impedance, a damping solution is needed.
SYSTEM USING A SUBCIRCUIT SHARED BETWEEN CAPACITORS FOR PROVIDING REACTIVE POWER

TECHNICAL FIELD

The present invention relates to power systems. More specifically, the present invention relates to systems and methods for mitigating the harmonic resonance of capacitors used to provide reactive power to power systems.

BACKGROUND

Shunt capacitors are the most commonly used reactive power compensation apparatus in power systems. Connected between a bus and ground, each shunt capacitor injects capacitive reactive power into the system. One or more shunt capacitors can be used to boost the bus voltage, improve the system's power factor, and/or reduce power loss. Since a power system's reactive power needs often change, multiple switchable shunt capacitors can be connected to the same bus. Using switches, each of the capacitors can be connected or unconnected to the system based on system condition. This leads to a variable reactive power compensation apparatus. For example, if there are two switchable capacitors of 1 MVar and 1.5 MVar respectively, the total output of the apparatus can be 1 MVar (first capacitor on), 1.5 MVar (second capacitor on) and 2.5 MVar (both capacitors are on).

Although shunt capacitors are a simple and effective reactive power compensation apparatus, they suffer from the problem of resonance. Resonance occurs when a component's capacitive impedance is approximately equal to the system's inductive impedance at a particular frequency (e.g. 300 Hz). If the system has a current or voltage source at 300 Hz, resonance can occur. If resonance occurs, this can lead to a significant amplification of the 300 Hz voltage/current and eventual damage to the capacitors.

Power systems are designed to operate at one frequency, usually either at 50 Hz or 60 Hz. While voltage or current sources at other frequencies were very rare in the past, in recent years there has been an increase in the use of power electronic converters by utility customers. Such converters can inject currents (called harmonic currents) at frequencies that are integer multiple of the fundamental frequency. If a harmonic current has, for example, a frequency of 300 Hz (i.e. 5×60 Hz), a capacitor resonance may be excited or may occur. In the power industry, a resonance excited by or caused by harmonic currents or voltages is called a harmonic resonance. Shunt capacitors can thus be negatively affected by harmonic resonance.

Some solutions have been developed to mitigate the shunt capacitor related harmonic resonance. One method is to add a detuning inductor in series with the shunt capacitor. The detuning inductor changes the shunt capacitor into an inductive characteristic at the harmonic frequencies of concern, thereby mitigating the capacitor-system resonance. This method has been widely used in low and medium voltage systems due to its simple implementation and low cost. However, this method does not always work if the system exhibits capacitive impedance at certain frequencies. To address this issue, a damping element can be added to a shunt capacitor. The damping element's resistive component can damp the magnitude of resonance. U.S. Pat. Nos. 3,881,137, 3,555,291, 4,864,484, 5,805,032 disclose several topologies of damping elements to mitigate the capacitor-system resonance. Some utility companies have added damping elements to their high voltage shunt capacitors to mitigate harmonic resonance.

In addition to the above approach, R, L, or C components can be added in series with a shunt capacitor to turn it into a harmonic filter. For example, an inductor can be connected in series with a capacitor. The inductor is sized in such a way that the total impedance of the combined capacitor and inductor branch is zero at a harmonic frequency. Harmonic current at that frequency will flow to this low impedance branch. This branch thus becomes a standard single-tuned harmonic filter. Several approaches to converter a shunt capacitor into a harmonic filter have been reported in U.S. Pat. Nos. 3,038,134, 3,535,542, 4,406,991, 4,622,474, 4,939,486, 5,565,713, 5,668,418.

At present, the above resonance mitigation or harmonic filtering measures have been used for individual shunt capacitors. This means that, for multiple switchable capacitors, each of the capacitors requires a detuning, damping, or filtering element. The cost and space requirements for implementing these changes increase with the number of switchable capacitors.

There is therefore a need for systems, methods, and/or devices that mitigate if not overcome the shortcomings of the prior art.

SUMMARY

The present invention provides systems and devices that provide a shared detuning, damping, or filtering element to one or more capacitors. A number of circuit branches are coupled in parallel to each other between a first coupling point and a second coupling point. A subcircuit is coupled between the second coupling point and a third coupling point. Each branch includes at least one capacitor that provides reactive power to power systems while the subcircuit is configured to provide detuning, damping, or filtering to the multiple branches.

In an embodiment, there is provided a common detuning, damping or filtering element that is shared by multiple switchable capacitors. The element is designed in such a way that it will provide adequate detuning, damping or filtering capability for all possible on/off combinations of the capacitors sharing the same element. The total cost and space requirements for mitigating resonance or filtering harmonics associated with multiple switchable capacitors are thereby reduced.

In a first aspect, the present invention provides a circuit comprising:
- at least two circuit branches coupled in parallel between a first connection point and a second connection point;
- a subcircuit coupled between said second connection point and a third connection point;
- wherein
- at least one of said at least two circuit branches comprises a switch and a capacitor coupled in series to each other such that closing said switch couples said capacitor to said circuit and opening said switch uncouples said capacitor from said circuit;
- said circuit is for providing reactive power to a power system.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1A:
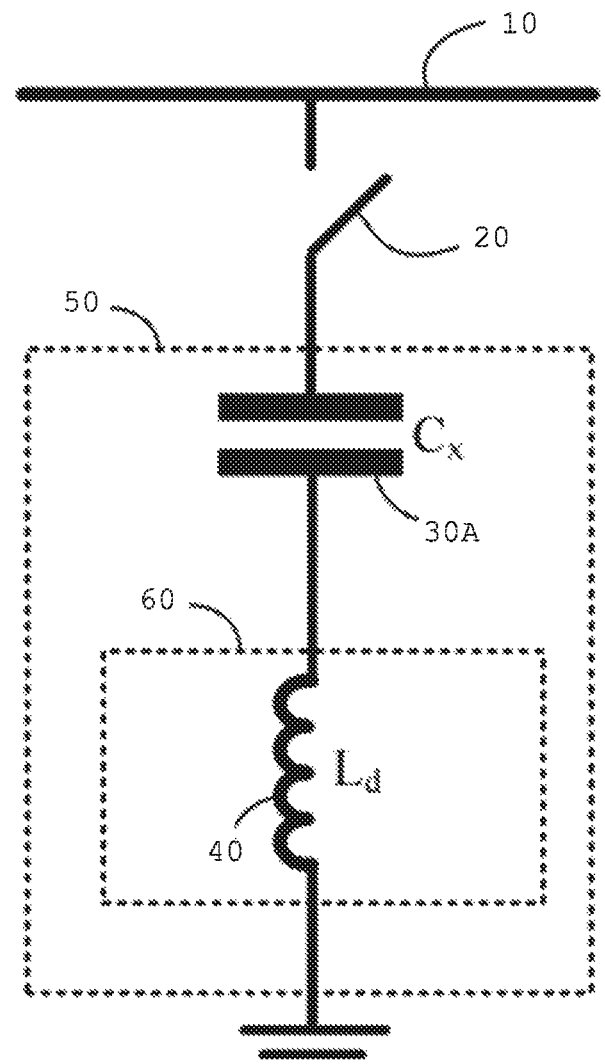
FIG. 1A is a circuit diagram of a system according to the prior art.
Figure 1B:
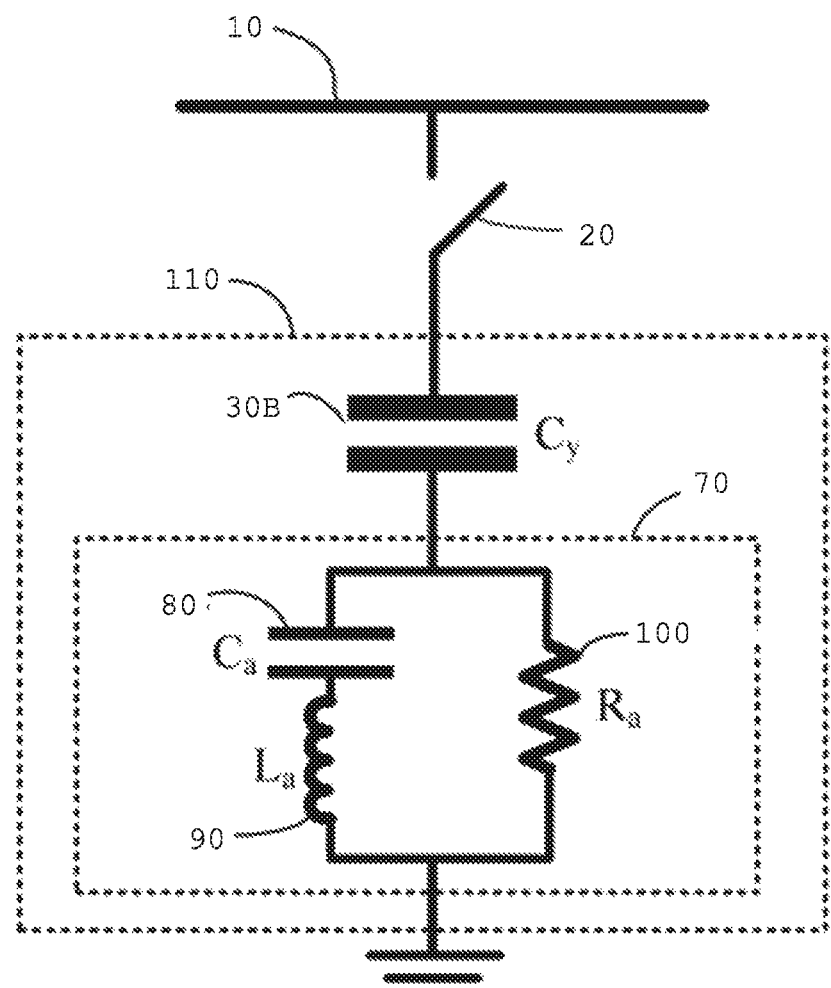
FIG. 1B is a circuit diagram of another system according to the prior art.

Referring to FIGS. 1A and 1B, depicted are schemes commonly used for mitigating harmonic resonance of shunt capacitors (all figures shown are in the form of single-phase diagram).

Referring to FIG. 1A, a bus 10 is coupled to a switch 20. Coupled to the switch 20 is a capacitor 30A.

Capacitor 30A is coupled in series to inductor 40 which is coupled to ground.

In the circuit in FIG. 1A, the size of inductor 40 is selected such that subcircuit 50 exhibits an inductive characteristic at frequencies higher than a frequency called the detuning frequency. This frequency can be the fundamental or the 3rd harmonic frequencies. If the system impedance is also inductive, resonance at harmonic frequencies that are higher than the detuning frequency can be avoided. This scheme has been widely used for low voltage (<600V) or medium voltage (<25 kV) capacitors. Element 60 is denoted as the detuning element and 40 is the detuning inductor.

As an alternative to the above, the inductor 40 can be sized to make the total impedance of subcircuit 50 close to zero at a harmonic frequency (e.g. 300 Hz). This subcircuit 50 then becomes a (single-tuned) harmonic filter that can trap 300 Hz harmonics (see "IEEE Guide for Application and Specification of Harmonic Filters," in IEEE Std 1531-2003, the entirety of which is hereby incorporated by reference). The element that enables a capacitor to filter harmonics is called the filtering element in this document. For the circuit in FIG. 1A, the filtering element is element 60 which consists of an inductor 40.

Referring to FIG. 1B, similar to FIG. 1A, a bus 10 is coupled to a switch 20 which leads to a capacitor 30B. This capacitor 30B is connected in series with a subcircuit 70. Within subcircuit 70 are two branches in parallel to one another—one branch has an auxiliary capacitor 80 in series with a detuning inductor 90. The other branch has a damping resistor 100. The function of the detuning inductor 90 is similar to that of the detuning inductor 40 in FIG. 1A, that is, to change the frequency response of the combined subcircuit 110. The damping resistor 100 further improves the resonance mitigation performance by absorbing the harmonic energy that oscillates between subcircuit 110 and the system. The auxiliary capacitor 80 is connected in series with the detuning inductor 90 to reduce the loss of the damping resistor 100 at the fundamental frequency. This configuration has been widely used to damp harmonic resonance for capacitors at high voltages (>25 kV). Subcircuit 70 can therefore be characterized as a damping element.

As an alternative to the above, auxiliary capacitor 80, inductor 90, and resistor 100 can be sized to render the subcircuit 110 into a high-pass harmonic filter (see "IEEE Guide for Application and Specification of Harmonic Filters," in IEEE Std 1531-2003, the entirety of which is hereby incorporated by reference). The topology of subcircuit 110 is commonly called a C-type filter in industry and subcircuit 70 is its filtering element in FIG. 1B.

In addition to the above examples, other topologies of the damping/filtering element have been proposed and are used in industry. An example is the 3rd order high-pass filter (see W. Xu, et al "Resonance-Free Shunt Capacitors—Configurations, Design Methods and Comparative Analysis," in IEEE Transactions on Power Delivery, vol. 31, no. 5, pp. 2287-2295, October 2016, the entirety of which is hereby incorporated by reference.).

Figure 2:
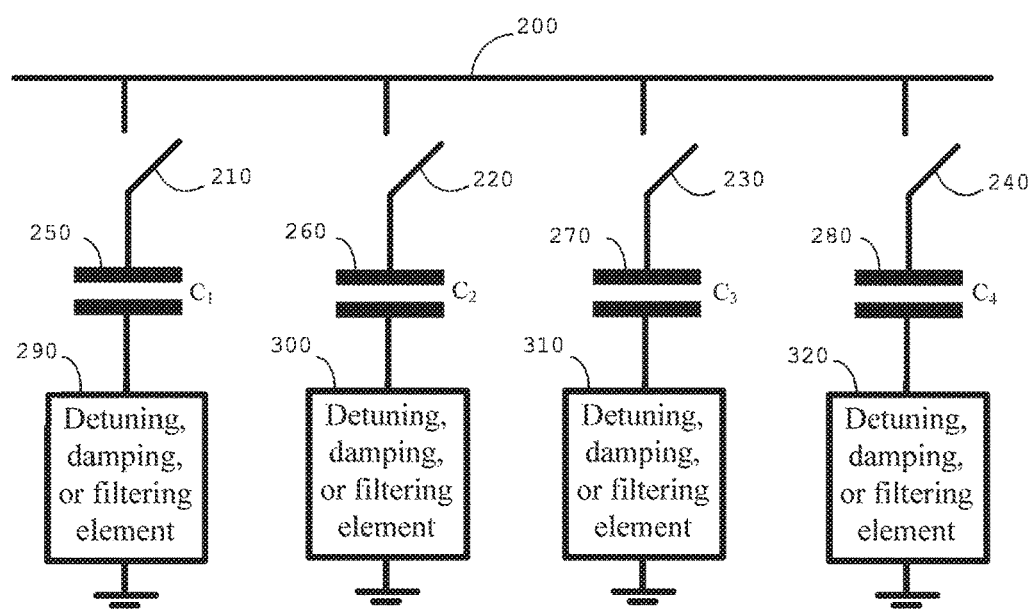
FIG. 2 is another circuit diagram of a system according to the prior art.

If there are multiple switchable capacitors, a common configuration used to mitigate harmonic resonance or to perform harmonic filtering is shown in FIG. 2.

In FIG. 2, a bus 200 is used to connect four circuit branches, each branch having a switch (210, 220, 230, 240) and a capacitor (250, 260, 270, 280). As can be seen, capacitors 250, 260, 270, 280 are switchable capacitors. These capacitors are connected to the same bus 200 by switches 210, 220, 230, 240. The capacitors are switched on or off according to the reactive power requirement of the system. To prevent harmonic resonance that may be caused by any one of the capacitors, resonance mitigation elements in the form of either a detuning element or a damping element is added to each capacitor. These resonance mitigation elements 290, 300, 310, 320 are each directly coupled to a capacitor. These resonance mitigation elements can take any number of forms. For example, these elements 290, 300, 310, 320 may take the form such as those shown as element 60 or subcircuit 70 in FIGS. 1A and 1B.

It should be clear that if the intention is to turn the capacitors in FIG. 2 into harmonic filters, elements 290, 300, 310, 320 can be sized to become filtering elements. It should be clear that if there are N switchable capacitors, N detuning, damping or filtering elements are needed. This increases the cost and space requirements for the entire apparatus.

Figure 3:
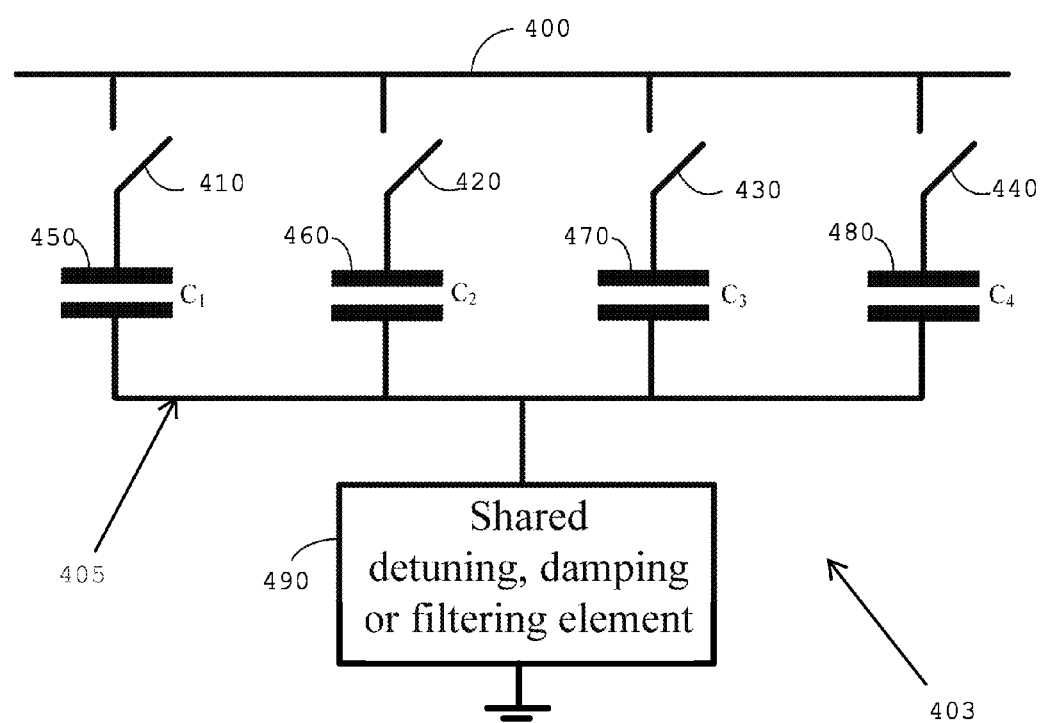
FIG. 3 is a circuit diagram of a system according to the present invention.

Referring to FIG. 3, one embodiment of the present invention is illustrated. In FIG. 3, a bus 400 couples a number of circuit branches to each other in parallel. Each branch is coupled in parallel with other branches between coupling point 400 and coupling point 405 with each branch having a switch and a capacitor in series. Thus, each one of switches 410, 420, 430, 440 is coupled in series with capacitor 450, 460, 470, 480. In the circuit 403 in FIG. 3, coupled between coupling point 405 and ground is subcircuit 490. It should be clear that while this example is coupled to ground, other embodiments of the invention may be ungrounded or may be coupled to other circuits or circuit elements.

Circuit 403 has four switchable capacitors 450, 460, 470, 480 connected to the same bus 400. These capacitors are switched on or off (using switches 410, 420, 430, 440) according to the reactive power requirements of the system. To prevent harmonic resonance that may be caused by any one of the capacitors, a resonance mitigation element or subcircuit 490 is added and it is shared by the four capacitors 450, 460, 470, 480. The subcircuit 490 is designed such that it will provide adequate detuning or damping capability for all possible on/off combinations of the capacitors. Subcircuit 490 can also be designed to turn the switchable capacitors into switchable harmonic filters.

Subcircuit 490 can take many forms and some of these will be illustrated later in this document. Compared with the existing approach in FIG. 2 that requires each capacitor to be coupled to a specific resonance mitigation or harmonic filtering element 290, 300, 310, 320, the present invention reduces cost and space requirements. In one example (to be discussed below), the embodiment illustrated in FIG. 5 can reduce at least one-third of the costs and one half of the space requirements when compared to the prior art for two switchable capacitors.

Figure 4:
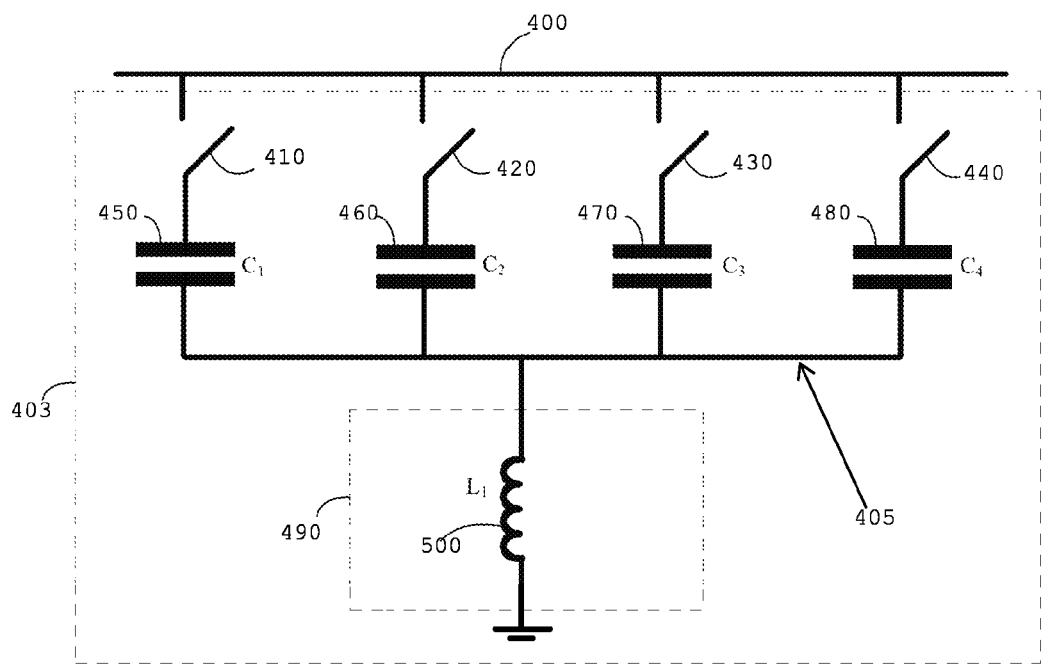
FIG. 4 is a circuit diagram of a system according to one embodiment of the present invention where the shared subcircuit functions as a detuning element.

FIG. 4 presents a first specific embodiment of the present invention. In FIG. 4, similar components as in FIG. 3 are referenced with similar reference numbers. As can be seen in FIG. 4, each one of four capacitors 450, 460, 470, 480 is coupled in series to a specific one of four switches 410, 420, 430, 440. The four branches (each branch having a capacitor and a switch in series) are coupled in parallel to each other between a first connection point/bus 400 and a second connection point 405. Subcircuit 490 is coupled between ground and the second connection point 405. For this embodiment, subcircuit 490 is an inductor 500. The inductor 500, if designed or sized properly, can act as a detuning inductor. The detuning inductor 500 can cause the entire subsystem 403 to exhibit an inductive characteristic at frequencies higher than a detuning frequency for all possible on/off combinations of the capacitors. If the system impedance is also inductive, resonance at harmonic frequencies that are higher than the detuning frequency can be avoided.

The embodiment in FIG. 4 may be implemented by employing the following design methods.

Design Condition 1: Reactive Power Support

The desired values for capacitors 450, 460, 470, 480 in farads can be determined by its reactive power requirement:

$$C_i = \frac{Q_i}{\omega_0 V_0^2}, i = 1, 2, 3, 4 \quad (1)$$

where $C_1$, $C_2$, $C_3$, $C_4$ are the values of capacitors 450, 460, 470, 480 in farads, respectively. $Q_1$, $Q_2$, $Q_3$, $Q_4$ are the reactive power requirements of capacitors 450, 460, 470, 480 respectively. $V_0$ is the system nominal voltage and $\omega_0$ is the system fundamental angular frequency.

Design Condition 2: Inductive Impedance Condition

The shunt-connected subsystem 403 exhibits an inductive characteristic for frequencies higher than $\omega_T$ for all possible on/off combinations of the capacitors. This feature can be achieved by sizing inductor 500 according to the following equation:

$$L_1 = \frac{1}{\omega_T^2 C_{min}}, C_{min} = \min(C_1, C_2, C_3, C_4) \quad (2)$$

where $L_1$ is the value of inductor 500 in henries, $C_{min}$ is the smallest value among $C_1$, $C_2$, $C_3$, $C_4$, and $\omega_T$ is the detuning frequency.

By solving Equations (1) and (2), the values for the various components in FIG. 4 can be determined.

Figure 5:
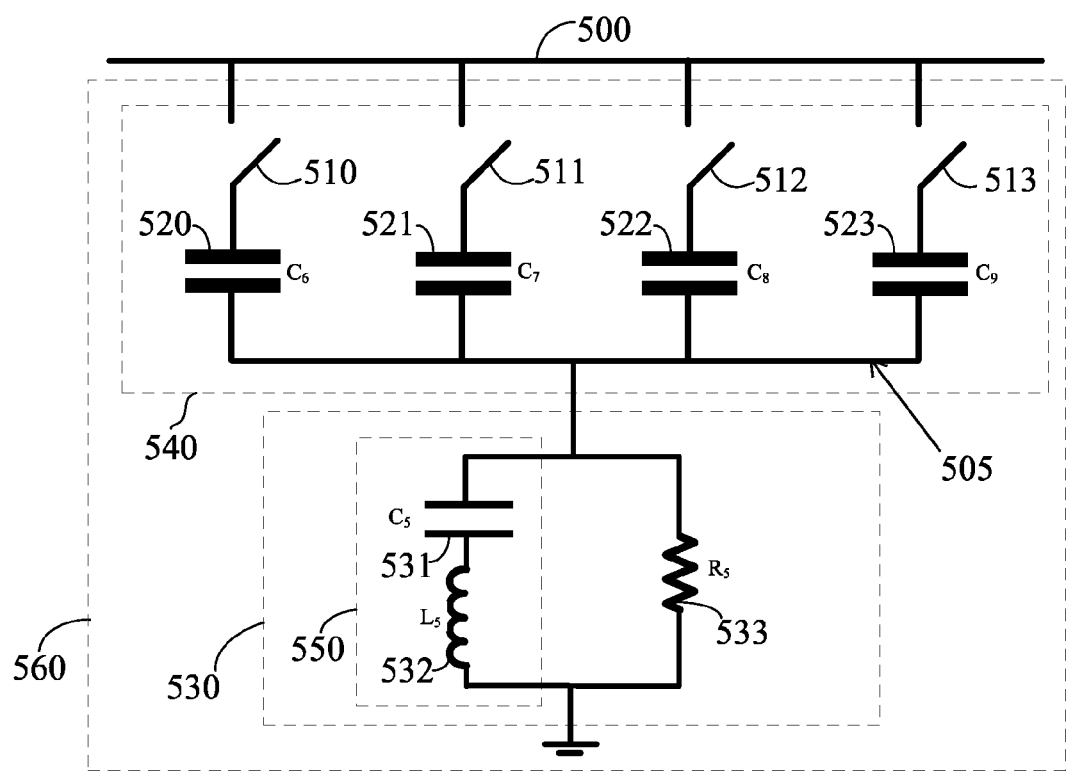
FIG. 5 is a circuit diagram of a system according to another embodiment of the present invention where the shared subcircuit functions as a damping element.

Referring to FIG. 5, illustrated is a second specific embodiment of the present invention. Similar to the subsystem in FIG. 4, FIG. 5 shows a subsystem 560 where each of four capacitors 520, 521, 522, 523 is coupled in series to a switch 510, 511, 512, 513. Each circuit branch contains a switch and a capacitor coupled in series and each circuit branch is coupled in parallel to the other circuit branches between a bus/coupling point 500 and a coupling point 505. Between the coupling point 505 and ground is a subcircuit 530. In FIG. 5, the subcircuit 530 is used as a damping element.

As can be seen in FIG. 5, the four switchable capacitors 520, 521, 522 and 523 all share the subcircuit 530, used as a damping element. The subcircuit 530 consists of three components split between two arms. The first arm 550 has a capacitor 531 coupled in series to an inductor 532 and the second arm has resistor 533. The arms are coupled in parallel to each other. The sizes of capacitor 531 and inductor 532 are selected such that arm 550 has zero reactance at the fundamental frequency. This leads to the bypass of resistor 533 and, thereby, the elimination of power loss at the fundamental frequency. At the harmonic frequency, resistor 533 damps the magnitude of the harmonic resonance for all possible on/off combinations of the capacitors.

The embodiment in FIG. 5 may be implemented by employing the following design methods.

Design Condition 1: Reactive Power Support

The value of capacitors 520, 521, 522 and 523 in farads can be determined by its reactive power requirement (similar to Equation (1)):

$$C_i = \frac{Q_i}{\omega_0 V_0^2}, i = 6, 7, 8, 9 \quad (3)$$

where $C_6$, $C_7$, $C_5$, $C_9$ are the values of capacitors 520, 521, 522, 523 in farads, respectively. $Q_6$, $Q_7$, $Q_5$, $Q_9$ are the reactive power requirements of capacitors 520, 521, 522, 523, respectively. $V_0$ is the system nominal voltage and $\omega_0$ is the system fundamental angular frequency.

Design Condition 2: Fundamental Frequency Loss Minimization

Capacitor 531 and inductor 532 have equal reactance at the fundamental frequency and this leads to the second design equation (4):

$$L_5 = 1/(\omega_0^2 C_5) \quad (4)$$

where $L_5$ is the value of inductor 532 in henries and $C_5$ is the value of capacitor 531 in farads.

Design Condition 3: Resonance-Free Condition

The worst-case amplification of the harmonic voltage at the interconnection bus after a shunt device is connected to a system is $$HAR_{worst}(\omega) = \max\left(\frac{V_{post}(\omega)}{V_{pre}(\omega)}\right) = \sqrt{1 + \left(\frac{X_Z(\omega)}{R_Z(\omega)}\right)^2} \quad (5)$$

where $HAR_{worst}(\omega)$ is the worst-case harmonic amplification ratio at the frequency $\omega$, $V_{post}(\omega)$ is the harmonic voltage at the frequency $\omega$ after the shunt device is connected, and $V_{pre}(\omega)$ is the harmonic voltage at the frequency $\omega$ before the shunt device is connected. In Equation (5), $X_z(\omega)$ and $R_z(\omega)$ are the reactive and real component of the harmonic impedance of the shunt device at the frequency $\omega$, respectively. The resonance-free condition is defined as $HAR_{worst}(\omega)$ less than a user selected threshold $HAR_{limit}$, for frequencies higher than the tuning frequency $\omega_T$, as shown in Equation (6):

$$HAR_{worst}(\omega) \leq HAR_{limit}, \text{ for } \omega \geq \omega_T \quad (6)$$

Design Condition 4: Cost Minimization

Cost minimization can be adopted as the fourth design condition. When the required reactive power output is given, the larger value for inductor 532, the greater of the capacities are needed for both inductor 532 and capacitor 531. Also, the cost for both inductor 532 and capacitor 531 are positively correlated to their capacities. If the value of inductor 532 (i.e. $L_5$), can be reduced to a minimum, the total investment for subcircuit 530 is assumed to also be at a minimum.

Therefore, the cost minimization is to minimize $L_5$. This leads to the fourth design equation (7):

$$\text{Cost} = \min(L_5) \quad (7)$$

By solving (3), (4), (6) and (7), the values for the various components in the circuit of FIG. 5 can be determined.

Figure 6:
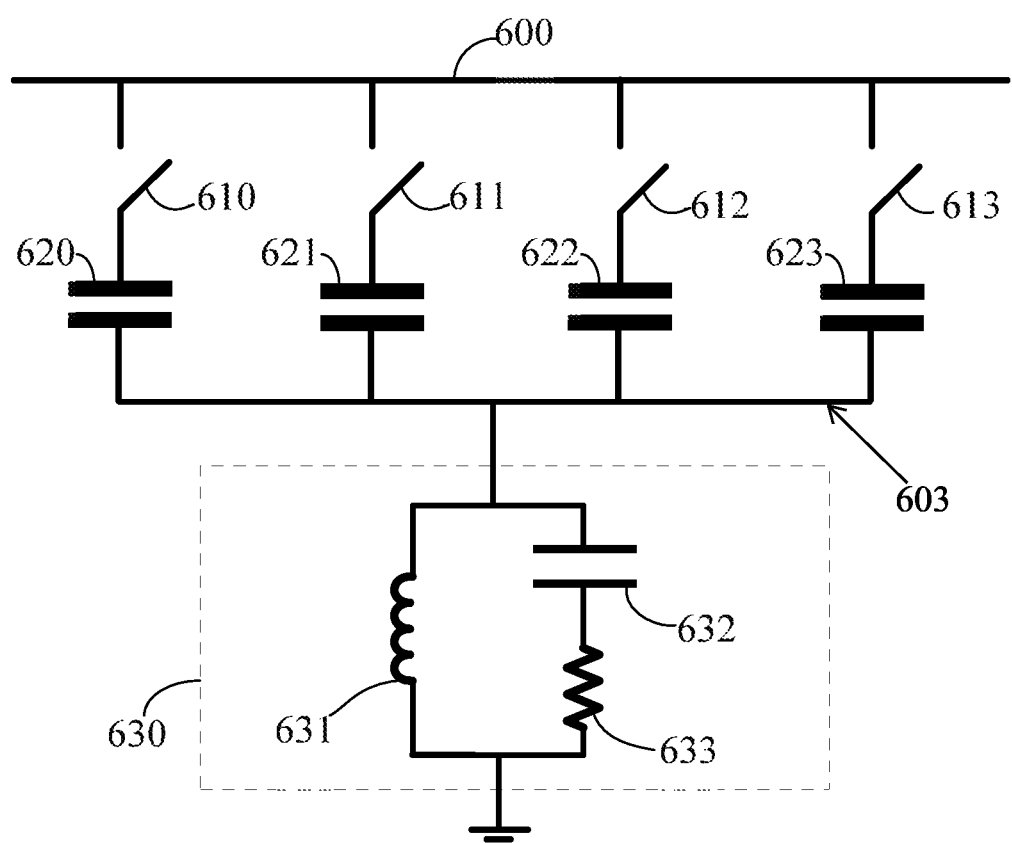
FIG. 6 is a circuit diagram of a system according to a variant of embodiment illustrated in FIG. 5.

Referring to FIG. 6, yet another embodiment of the present invention is illustrated. In this embodiment, a damping element is shared among a number of capacitors coupled in parallel to each other.

In FIG. 6, a first coupling point 600 and a second coupling point 603 have a number of branches coupled in parallel between them. Each branch has a switch and a capacitor coupled in series. In the branches, each one of switches 610, 611, 612, 613 is coupled in series with one of the capacitors 620, 621, 622, 623. Between the second coupling point 603 and ground is a subcircuit 630. For this embodiment, the shared subcircuit 630 operates as a damping element to the various capacitors coupled to the circuit.

The subcircuit 630 has, in one embodiment, two arms in parallel with each other. A first arm has an inductor 631 while a second arm has a capacitor 632 and a resistor 633 coupled in series to one another. One variation only has the resistor in the second arm. In another variation of this embodiment, the capacitor element 632 is removed and this thereby lets the impedance of capacitor 632 to be zero. Design equations for these embodiments can be established based on the principles shown in the first and second embodiments and the intended applications of the capacitors.

Figure 7:
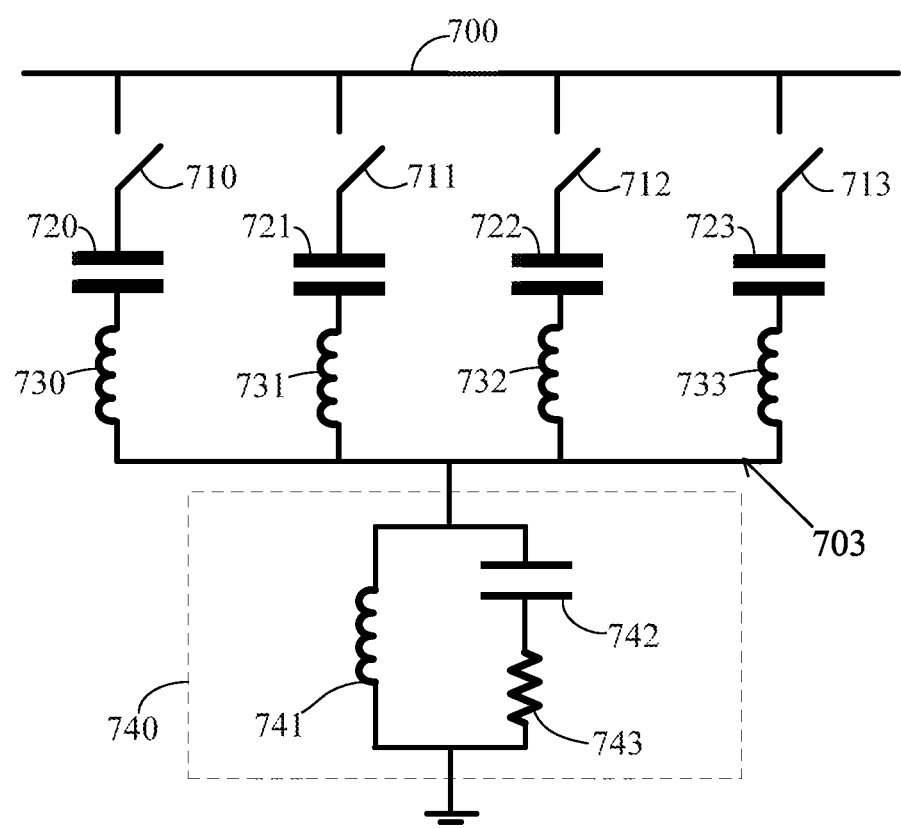
FIG. 7 is a circuit diagram of a system according to a variant of the system illustrated in FIG. 6.

FIG. 7 illustrates another embodiment of the present invention. In this embodiment, each of the parallel branches between the first coupling point and the second coupling point includes an inductor in series with the capacitor and the switch.

As can be seen from FIG. 7, the first coupling point 700 and the second coupling point 703 has four branches coupled in parallel between them. Each branch has a switch, a capacitor, and an inductor in series. The switches 710, 711, 712, 713 couple or uncouple its own capacitor from the system. Each of the capacitors 720, 721, 722, 723 has its own series inductor 730, 731, 732, 733. All of the capacitors share a subcircuit 740 that operates as a common damping element. For this embodiment, the subcircuit 740 has a topology similar to the topology of the subcircuit 630 in FIG. 6. Referring to the subcircuit 740, the configuration illustrated in FIG. 7 exhibits the characteristics of a high-pass harmonic filter.

Design equations for these embodiments can be established based on the principles shown in the first and second embodiments and the intended applications of the capacitors.

It should be clear that any number of capacitors or switchable capacitors may be used with the present invention. The Figures are not meant to restrict the invention to the four switchable capacitors illustrated in the Figures. A minimum of two switchable capacitors is commonly used for high voltage shunt capacitors.

The present invention may be used for either three-phase power systems or for single-phase power systems. The common application is for three-phase systems.

It should further be clear that the design constraints noted above are not determinative as others may also be used. Similarly, not all design constraints noted above are strictly necessary to implement the present invention. As an example, the cost minimization design condition for the embodiment illustrated in FIG. 5 may be ignored or it may be replaced by one that minimizes harmonic loss or harmonic voltage.

As has been demonstrated by the various embodiments of the present invention, the subcircuit shared by the capacitors in the circuits disclosed can be designed to perform detuning, damping, or a filtering function depending on what a user needs. As examples, the topologies shown in FIG. 5 and FIG. 6 can be designed to perform the function of harmonic filtering in addition to providing reactive power support.

It should be clear that sharing a common element to reduce cost and space requirements is not limited to switchable capacitors. It can also be used for multiple switchable harmonic filters. One example is illustrated in FIG. 7 which exhibits a harmonic filtering characteristic in addition to providing reactive power support.

It should be clear that other variations may be possible for the invention. As an example, the embodiment illustrated in FIG. 3 may have, instead of a single shared element, multiple shared elements, each of which could be switched into or out of the circuit as necessary. Thus, for this variant, there may be multiple instances of the shared element 490, each instance being coupled in parallel with other instances and being coupled between ground and connection point 405. Each instance of a shared element can be coupled to connection point 405 by a switch and, as each shared element is needed, the relevant switch is closed to thereby couple that shared element into the circuit. As each shared element is not needed, the relevant switch is opened to thereby decouple that shared element from the circuit.

A person understanding this invention may now conceive of alternative structures and embodiments or variations of the above all of which are intended to fall within the scope of the invention as defined in the claims that follow.

What is claimed is:

1. A circuit comprising:
   at least two circuit branches coupled in parallel between a first connection point and a second connection point;
   at least one subcircuit coupled between said second connection point and a third connection point;
   wherein
   at least one of said at least two circuit branches comprises a switch and a capacitor coupled in series to each other such that closing said switch couples said capacitor to said circuit and opening said switch uncouples said capacitor from said circuit;
   said subcircuit is for mitigating harmonic resonance between said at least one subcircuit and said circuit; and
   said circuit is for providing reactive power to a power system.

2. The circuit according to claim 1, wherein said subcircuit is for driving an impedance of said subcircuit to approximately zero at harmonic frequencies of a fundamental frequency of said circuit.

3. The circuit according to claim 1, wherein said subcircuit exhibits an inductive characteristic at frequencies higher than a detuning frequency.

4. The circuit according to claim 3, wherein at least one of said at least two circuit branches further comprises an inductor coupled in series with said switch and said capacitor.

5. The circuit according to claim 4, wherein each of said at least two capacitors is coupled in series to an inductor.

6. The circuit according to claim 1, wherein said subcircuit comprises a first arm coupled in parallel to a second arm between said second connection point and said third connection point, said first arm comprising a capacitor and an inductor coupled in series to one another.

7. The circuit according to claim 6, wherein said second arm comprises a resistor.

8. The circuit according to claim 1, wherein said subcircuit comprises a first arm coupled in parallel to a second arm between said second connection point and said third connection point, said first arm comprising a capacitor and a resistor coupled in series to one another.

9. The circuit according to claim 8, wherein said second arm comprises an inductor.

10. The circuit according to claim 9, wherein at least one of said at least two circuit branches further comprises an inductor coupled in series with said switch and said capacitor.

11. The circuit according to claim 1, further comprising at least one switch for coupling said at least one subcircuit to said second connection point.

* * * * *